J. F. SKIRROW.
APPARATUS TO INDICATE THE STOPPAGE OF CARRIERS IN THE TRANSMISSION TUBES OF PNEUMATIC DESPATCH TUBE SYSTEMS.
APPLICATION FILED JAN. 25, 1912.
1,087,329.
Patented Feb. 17, 1914.
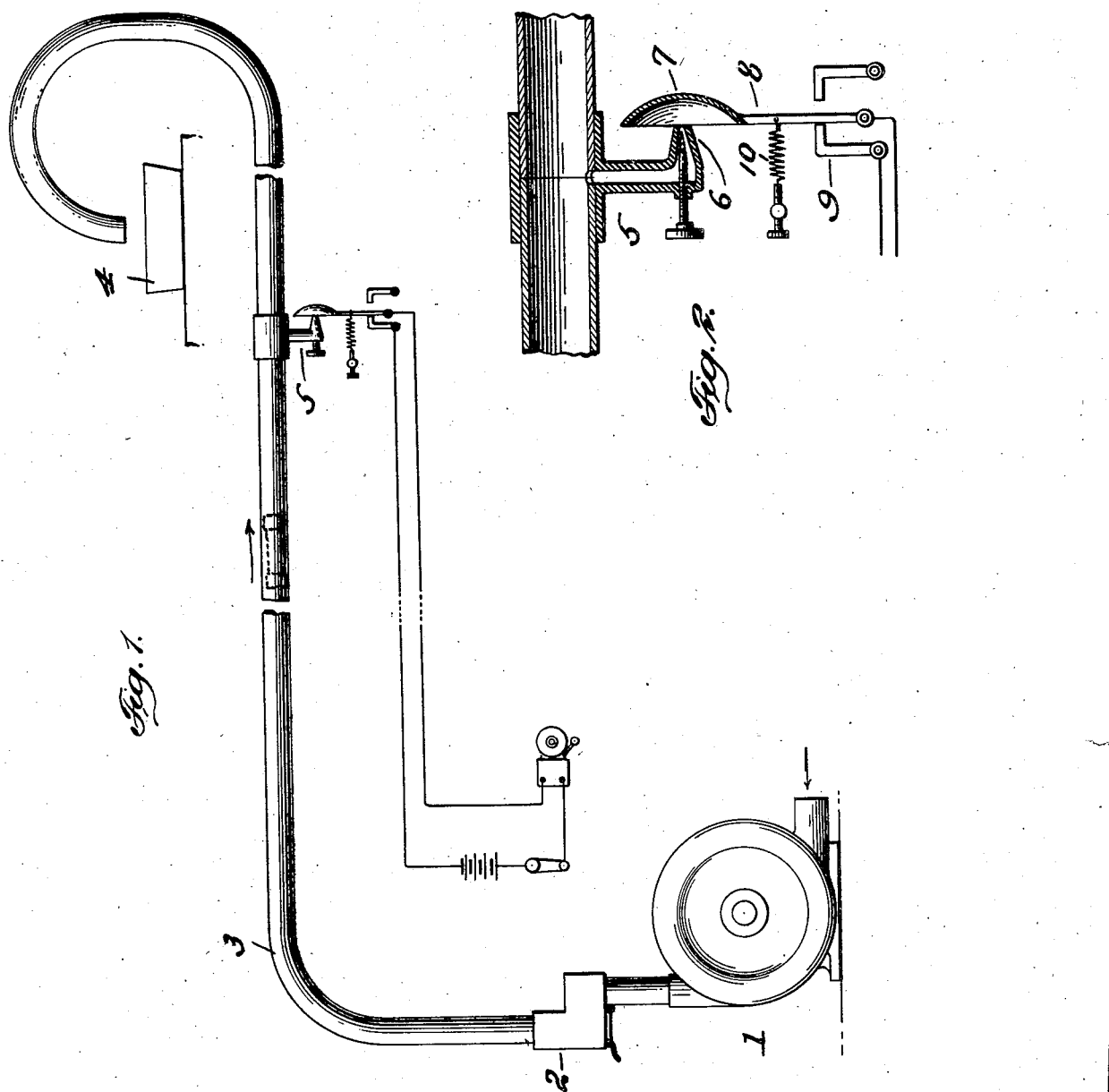

UNITED STATES PATENT OFFICE.

JOHN F. SKIRROW, OF EAST ORANGE, NEW JERSEY.

APPARATUS TO INDICATE THE STOPPAGE OF CARRIERS IN THE TRANSMISSION-TUBES OF PNEUMATIC-DESPATCH-TUBE SYSTEMS.

1,087,329.  Specification of Letters Patent.  Patented Feb. 17, 1914.

Application filed January 25, 1912. Serial No. 673,472.

*To all whom it may concern:*

Be it known that I, JOHN F. SKIRROW, a citizen of the United States, and resident of the town of East Orange, county of Essex, and State of New Jersey, have invented certain new and useful Improvements in Apparatus to Indicate the Stoppage of Carriers in the Transmission-Tubes of Pneumatic-Despatch-Tube Systems, of which the following is a specification.

The object of this invention is to provide a simple and reliable means to indicate when a carrier has been stopped in the transmission tube of a pneumatic despatch tube apparatus.

Another object of the invention is to provide a pressure device near the exit end of the transmission tube, adapted to be operated by the air flowing outwardly through the tube in front of an approaching carrier and to connect said pressure device to a suitable signaling means at the transmission end of the tube so that the operator transmitting carriers will know whether or not said carriers are traveling through the transmission tube.

Another feature of the invention is to provide means whereby upon the failure of air to move in its normal manner through the transmission tube near the exit end thereof, an electric signaling circuit will be completed, thereby giving warning to the operator at the sending end of the tube that a carrier, or some other matter, has sufficiently blocked the transmission tube to prevent or materially interfere with the flow of air therethrough.

Another object of the invention is to place the pressure device a suitable distance inwardly from the discharge end of the transmission tube, so that the pressure therein may be utilized to operate a signaling device.

Another object of the invention is to provide pressure actuated means which, upon any material variation in the flow of air through the transmission tube, will permit the contacts of an electric circuit to come together and thereby complete an alarm circuit, the alarm being at the transmitting end of the carrier tube.

This invention is particularly adapted for use on long lines of transmission tubes where it is difficult to give notice to the transmission station when the carriers are blocked in the tube.

In the operation of transmission tubes of considerable length it heretofore has been found practically impossible to determine when the carriers are blocked therein, with the result that frequently a large number of carriers become blocked in the tube. It is then a difficult operation to release them. By means of this invention the stoppage of the first carrier will be immediately indicated to the operator at the transmission end of the tube and he will at once cease sending carriers until the stopped one is released and forwarded to the exit end of the tube.

Any suitable form of pressure device may be employed and any suitable form of indicator or signal may be arranged to be operated by said pressure device.

In the drawings, Figure 1 is a diagrammatic view of a pneumatic tube system with the automatic alarm applied thereto; and Fig. 2 a detail sectional view of the pressure device for opening and closing the alarm circuit.

Referring to the various parts by numerals, 1 designates a blower for supplying air under pressure to the transmission tube; 2 a transmission head through which the carriers may be inserted into the transmission tube. Said head may be of any suitable form. Connected to this transmitting head and extending to the receiving station is a transmission tube 3. The exit or discharge end of this tube is arranged to deliver carriers into a basket or other receptacle 4.

At the proper distance from the discharge end of the tube I insert in the tube and in communication with its interior, a pressure device 5. This device, as shown, consists of a jet nozzle 6 arranged to direct a jet of air into a vibratory cup 7, said cup being mounted on a pivoted arm 8 and arranged opposite the exit end of the jet nozzle.

Any suitable form of signal means may be employed at the receiving end of the tube, but I prefer to employ an electric bell, the circuit for said bell being connected to the vibratory arm carrying the cup, and to a front stop 9. The jet nozzle is in communication with the interior of the transmission tube and is located at such a distance from the discharge end thereof that the friction of the air on the sides of the tube and the atmospheric pressure at the open end of the tube will be sufficient to create a pressure in the tube so that, although the air is moving toward the exit end of the tube and is free to escape at said end there will still be sufficient pressure in the tube to operate the alarm device. As shown in the drawings, the air in the tube will pass out through the jet nozzle and impinge within the cup carried by the vibratory arm. The nozzle is provided with an adjustable valve so that the amount of air escaping therefrom may be nicely regulated. Connected to the vibratory arm is a spring 10 which normally tends to throw the said arm against the electric contact 9 to complete the alarm circuit. When a carrier is traveling through the transmission tube the air from the jet nozzle will force the cup and its lever away from the contact 9, thereby breaking the alarm circuit and indicating to the operator that the carrier is passing properly through the tube.

In the operation of the apparatus, when carriers are blocked in the transmission tube between the jet nozzle and the transmission station, the flow of air through the transmission tube and beyond the blocked carrier will be very small and the arm 8 is so adjusted that it will permit the spring 10 to swing it against the contact 9 upon a slight variation of the air jet from the jet nozzle. It is, therefore, manifest that when one carrier is blocked in the transmission tube the flow of air through the jet nozzle 6 will not be sufficient to hold the cup carrying arm away from the contact 9 and that, therefore, the alarm circuit will be completed and the signal given at the transmitting station that a carrier is blocked in the line.

It is manifest that the pressure operated device must be located a suitable distance from the discharge end of the tube in order that sufficient pressure may be obtained to hold the vibratory arm in position to open the alarm circuit. It is also manifest that many forms of pressure operated devices may be substituted for the jet nozzle shown and described herein, and I wish it to be distinctly understood that I am not to be restricted to the use of a jet nozzle in this form of apparatus for the purpose of holding open the alarm circuit.

It is to be noted that the apparatus is designed to be operated by the air pressure in front of a carrier and at the discharge end of the line. The air in front of a traveling carrier operates the apparatus to hold the signal circuit open, and upon the stoppage of said carrier within the tube the pressure in front of said carrier will be reduced and the alarm circuit will be completed.

This invention is particularly desirable for use on long transmission tubes where carriers are being constantly transmitted therethrough in one direction in rapid succession, and where at times, a number of said carriers are in transit at the same time. It is manifest that in an apparatus of this type the operator at the transmitting end or station of the tube should have instant notice of the stoppage of the carriers.

What I claim is:

1. The combination of a carrier transmitting tube, an alarm circuit, a signal in said circuit, means holding said circuit closed, and means located near the discharge end of the transmission tube and adapted to be operated by the air pressure in front of a moving carrier independently of the carrier propelling pressure, to hold the alarm circuit open whereby should the carrier stop the alarm circuit will be closed.

2. A pneumatic despatch tube provided with receiving and delivery terminals, means for supplying air under pressure to said tube to transmit carriers, an electric circuit including an alarm located adjacent the receiving terminal of the tube, a switch arm in the circuit near the discharge terminal, means acting on said switch to normally close the alarm circuit and a jet nozzle connected to the tube adjacent its delivery end and arranged to deliver a jet of air upon the switch arm to hold the circuit open.

3. A pneumatic despatch tube provided with receiving and delivery terminals, means for supplying air under pressure to said tube to transmit carriers, an electric circuit including an alarm located adjacent the receiving terminal of the tube, a switch arm in the circuit near the discharge terminal, means acting on said switch to normally close the alarm circuit and air operated means attached to the tube adjacent its delivery end and operating upon the switch arm to hold the alarm circuit open.

In testimony whereof I hereunto affix my signature in the presence of two witnesses.

JOHN F. SKIRROW.

Witnesses:
  A. J. EAVES,
  E. D. NOLLER.